US008938648B2

(12) United States Patent
Augustine et al.

(10) Patent No.: US 8,938,648 B2
(45) Date of Patent: Jan. 20, 2015

(54) MULTI-ENTITY TEST CASE EXECUTION WORKFLOW

(71) Applicant: Tata Consultancy Services Limited, Mumbai, Maharashtra (IN)

(72) Inventors: Nisha Ancy Augustine, Chennai (IN); Bhanu Raju, Puducherry (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 93 days.

(21) Appl. No.: 13/768,076

(22) Filed: Feb. 15, 2013

(65) Prior Publication Data

US 2013/0219227 A1 Aug. 22, 2013

(30) Foreign Application Priority Data

Feb. 18, 2012 (IN) .......................... 445/MUM/2012

(51) Int. Cl.
*G06F 11/00* (2006.01)
*G06F 11/36* (2006.01)

(52) U.S. Cl.
CPC ........ *G06F 11/3668* (2013.01); *G06F 11/3688* (2013.01); *G06F 11/3692* (2013.01)
USPC ........................................ 714/38.1; 717/124

(58) Field of Classification Search
USPC ....................................................... 714/38.1
See application file for complete search history.

(56) References Cited

U.S. PATENT DOCUMENTS

| | | | |
|---|---|---|---|
| 7,069,264 B2 | 6/2006 | Anjur et al. | |
| 7,512,933 B1 * | 3/2009 | Tortosa et al. | 717/124 |
| 7,529,990 B2 * | 5/2009 | Haggerty | 714/724 |
| 7,644,398 B2 * | 1/2010 | Cleaveland et al. | 717/135 |
| 7,657,789 B1 * | 2/2010 | Gerber et al. | 714/25 |
| 8,196,105 B2 * | 6/2012 | Singhal et al. | 717/124 |
| 2005/0160321 A1 * | 7/2005 | Cleaveland et al. | 714/38 |
| 2008/0270269 A1 | 10/2008 | Myers et al. | |
| 2009/0007072 A1 * | 1/2009 | Singhal et al. | 717/124 |
| 2009/0125826 A1 * | 5/2009 | Haggerty et al. | 715/764 |

OTHER PUBLICATIONS

Crawford I.M, Marketing research and information systems, 1997, Chapter 7, Marketing and Agribusiness Texts vol. 4, Food and Agriculture Organization of the United Nations, Rome, 1997 ISBN 92-5-103905-4.
Software Validation Test Facilitator Test-Scripts, IBM Technical Disclosure Bulletin, International Business Machines Corp. (Thornwood), US, vol. 35, No. 4B, Sep. 1, 1992, pp. 212-215, XP000313912. ISSN: 0018-8689.

(Continued)

*Primary Examiner* — Kamini Patel
(74) *Attorney, Agent, or Firm* — Banner & Witcoff, Ltd.

(57) ABSTRACT

The present subject matter relates to a method for managing a testing workflow, based on execution of at least one Multi Entity Test Case (METC) of the testing workflow. The method includes assigning at least one role to each of a plurality of test steps of the METC, where the at least one role is indicative of a privilege level to execute each of the plurality of test steps. The method also includes defining a failure condition for each of the plurality of test steps, where the failure condition is indicative of an expected result of execution of each of the plurality of test steps. The method further includes specifying a failure action associated with the failure condition for execution of each of the plurality of test steps, executing one of the plurality of test steps, and applying the failure action to proceed with the testing workflow.

10 Claims, 3 Drawing Sheets

(56) References Cited

OTHER PUBLICATIONS

HP Quality Center Software Version: 9.20 Tutorial Document, Number: QCTUT9.2/01, May 1, 2007, pp. 1-166, XP055061137. Retrieved from the Internet: URL: http://mytestingexp.files.wordpress.com/2010/09/qa_hp_tutorial.pdf [retrieved on Apr. 25, 2013].

Masood A et al: Scalable and Effective Test Generation for Role-Based Access Control Sysytems, IEEE Transactions on Software Engineering, IEEE Services Center, Los Alamitos, CA, US, vol. 35, No. 5, Sep. 1, 2009, pp. 654-668, XP011269032, ISSN: 0098-5589. DOI: 10.1109/TSE.2009.35.

Apr. 26, 2013—(EP) Search Report—App 13155625.

\* cited by examiner

MULTI-ENTITY TEST CASE EXECUTION WORKFLOW

TECHNICAL FIELD

The present subject matter, in general, relates to software testing and, in particular, relates to methods and systems for test case management.

BACKGROUND

Test cases are generally a set of conditions or variables based on which the functionality of an application or software can be tested. A typical software testing process includes the creation of multiple test cases based on the type of software to be tested, or the type of test to be performed, or a combination of both. To perform the test, one or more test cases can first be selected in order to test the software. The selection of the test case is based on the aspects of the software to be tested. Execution of the test cases is usually automated through utilization of a test framework, which applies the selected test cases to the software to be tested, and observes whether the response to the test are as expected. The test framework can generally also be configured to log the results of the test cases and report the same to a user.

The complete testing process of a software application, generally referred to as testing lifecycle, includes iterative testing processes that account for large amount of testing activities and information. These testing activities, testing information, and other related details need to be managed for reasons, such as maintaining traceability in the testing lifecycle. For larger testing projects, a larger amount of information and details need to be managed, which is a cumbersome and time consuming task.

SUMMARY

This summary is provided to introduce concepts related to multi-entity test case (METC) execution workflow, and the concepts are further described below in the detailed description. This summary is not intended to identify essential features of the claimed subject matter nor is it intended for use in determining or limiting the scope of the claimed subject matter.

In one implementation a method includes assigning at least one role to each of a plurality of test steps of the METC, where the at least one role is indicative of a privilege level to execute each of the plurality of test steps. The method also includes defining a failure condition for each of the plurality of test steps, where the failure condition is indicative of an expected result of execution of each of the plurality of test steps. The method further includes specifying a failure action associated with the failure condition for execution of each of the plurality of test steps, executing one of the plurality of test steps, and applying the failure action to proceed with the testing workflow.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
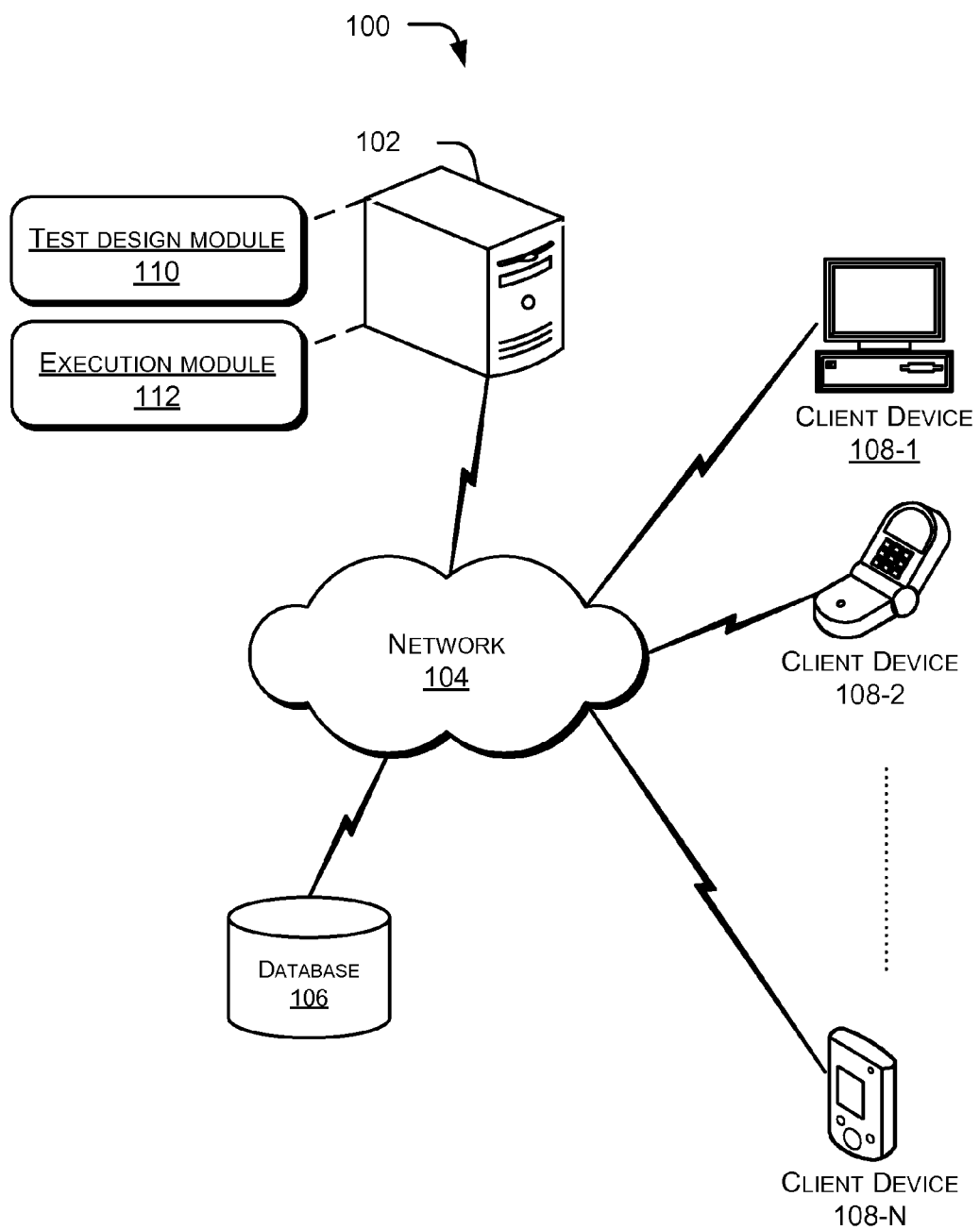
FIG. 1 illustrates a network environment implementing a Multi-Entity Test Case (METC) execution system, in accordance with an embodiment of the present subject matter.

Systems and methods for Multi-Entity Test Case (METC) execution workflow are described herein. The systems and methods can be implemented in a variety of computing devices, such as laptops, desktops, workstations, tablet-PCs, smart phones, notebooks or portable computers, tablet computers, mainframe computers, mobile computing devices, entertainment devices, computing platforms, internet appliances and similar systems. However, a person skilled in the art will comprehend that the embodiments of the present subject matter are not limited to any particular computing system, architecture or application device, as they may be adapted to take advantage of new computing systems and platforms as they become accessible.

Typical test case management systems are generally configured to manage a substantially large number of test cases for purposes, such as application or software testing. The test cases are selected based on the application or software to be tested, and can be executed by a testing framework of the test case management system. Furthermore, some test case management systems are provided with role based access, where multiple roles can be specified, for access to one or more of the entities of the test case management system. For example, a certain role can be configured to access a particular test case, perform an execution of the test case, and obtain access to the results thereof. Once the results of the test case are obtained, a user associated with said role may communicate the results to a further user based on a role of said further user. This further user can then decide to proceed with the testing of the application or software under testing or stop the testing, based on the result communicated.

In the above mentioned test case management system, users generally execute the test cases based on their discretion. In a testing environment having a substantially large number of test cases, and spread across various locations, the task of seamlessly and effectively managing the testing process can be a tedious task. Particularly, the task of manually managing and executing such vast numbers of test cases can be substantially effort intensive. Furthermore, with multiple personnel involved across various stages of the testing lifecycle, it can become substantially complicated and resource intensive to keep track of every test case execution, log the results thereof, and alert the required users upon every execution of the test cases.

The present subject matter describes systems and methods for a Multi-Entity Test Case (METC) execution workflow. In one implementation, the METC is a test case having more than one test step. The test steps of the METC are created to cater to a particular testing requirement or test scenario. The test scenario is generally created based on an overall workflow or process based on the type of application of software to be tested. For example, a test scenario can be a bank loan approval process, where at an initial stage a customer can submit a loan request form. Various test steps can be created according to the various stages of the loan approval process, for example from the loan request form submission to the acceptance and provision of the loan to the customer. This would involve different roles performing actions at each step to ensure that the loan is provisioned successfully. In one implementation, a plurality of roles can be configured, where each of the test steps of the test case are linked to one or more of the plurality of roles. In an example, each of the roles, indicative of a privilege or access level, are configured to execute one of the test steps of the test case. In an example, the privilege level is a right provided to the user in order for the user to access and execute the test steps of the test case. By providing said role configuration, enhanced traceability and logging of the testing process can be facilitated. For example, at various stages of a workflow, a substantially high degree of traceability for the execution and result of each of the test steps of each test case can be facilitated, even when multiple parties are involved at said various stages.

In one implementation, failure conditions can be defined for the result of each of the multiple test cases. In one example, a failure condition can be triggered for a particular test step, in case an actual result of the execution of said test case does not meet an expected result. Upon completion of the execution of a test step, it can be determined whether or not to proceed with the workflow, based on a failure action specified in the test step. For example, the failure action of the test step may specify whether or not to proceed with the execution of the subsequent test step. Furthermore, based on the role linked with the subsequent test step, the respective user or owner can be notified accordingly of the success or failure of the previous test step execution based on the failure action. Therefore, a system according to the present subject matter can be configured to decide to continue or stop the workflow, based on the execution of test cases.

In this manner, a substantially high degree of digitization of the workflow process can be facilitated, thereby reducing considerably, the amount of human effort required to carry out the testing process in the workflow. Furthermore, in one example, the respective owners or users of various roles can be kept updated of the workflow process, via a User Interface (UI) of a system according to the present subject matter. This can be beneficial in a substantially large scale workflow process, involving multiple parties and personnel, a vast number of test cases and test steps, and a plurality of products to be tested.

These and other advantages of the present subject matter would be described in greater detail in conjunction with the following figures. While aspects of described systems and methods for managing a workflow, based on an execution of a METC can be implemented in any number of different computing systems, environments, and/or configurations, the embodiments are described in the context of the following exemplary system(s).

FIG. 1 illustrates a network environment 100 implementing a Multi-Entity Test Case (METC) execution system 102, according to an embodiment of the present subject matter. In the network environment 100, the METC execution system 102 is connected to a network 104. Furthermore, a database 106, and one or more client devices 108-1, 108-2 . . . 108-N, collectively referred to as client devices 108, are also connected to the network 104.

The METC execution system 102 can be implemented as any computing device connected to the network 104. For instance, the METC execution system 102 may be implemented as mainframe computers, workstations, personal computers, desktop computers, multiprocessor systems, laptops, network computers, minicomputers, servers, and the like. In addition, the METC execution system 102 may include multiple servers to perform mirrored tasks for users, thereby relieving congestion or minimizing traffic.

Furthermore, the METC execution system 102 can be connected to the client devices 108 through the network 104. Examples of the client devices 108 include, but are not limited to personal computers, desktop computers, smart phones, PDAs, and laptops. Communication links between the client devices 108 and the METC execution system 102 are enabled through a desired form of connections, for example, via dial-up modem connections, cable links, digital subscriber lines (DSL), wireless or satellite links, or any other suitable form of communication.

Moreover, the network 104 may be a wireless network, a wired network, or a combination thereof. The network 104 can also be an individual network or a collection of many such individual networks interconnected with each other and functioning as a single large network, e.g., the internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, host bus adapters (HBAs), for providing a link between the METC execution system 102 and the client devices 108. The network devices within the network 104 may interact with the METC execution system 102 and the client devices 108 through communication links.

In one implementation, the METC execution system 102 includes a test design module 110 and an execution module 112. In one implementation, the test design module 110 can be configured to assign at least one role to each of a plurality of test steps of the METC, where the at least one role is indicative of a privilege level to execute each of the plurality of test steps. The test design module 110 can be further configured to specify a failure action for execution of a test step of the METC based on a failure condition of a previously executed test step. For example, the failure action can be specified so as to instruct the METC execution system 102 to not proceed with the execution of the subsequent test step of the METC upon triggering of the failure condition.

In one implementation, the execution module 112 can be configured to execute the test steps of the METC based on the assigned roles and the failure actions. The manner in which the execution module 112 executes the test steps of the METC is described in the detailed description pertaining to FIG. 2.

In one implementation, the user may utilize the client devices 108 to assign the one or more roles to each of a plurality of test steps of the METC, and specify the failure action for the execution of the plurality of the test steps. In one example, the client devices 108 can be provided with a User Interface (UI), via which the user can assign the one or more roles, and specify the failure action as described earlier. In another example, the client devices 108 can be configured to access a UI hosted at a third party location in order to assign the one or more roles, and specify the failure conditions.

Figure 2:
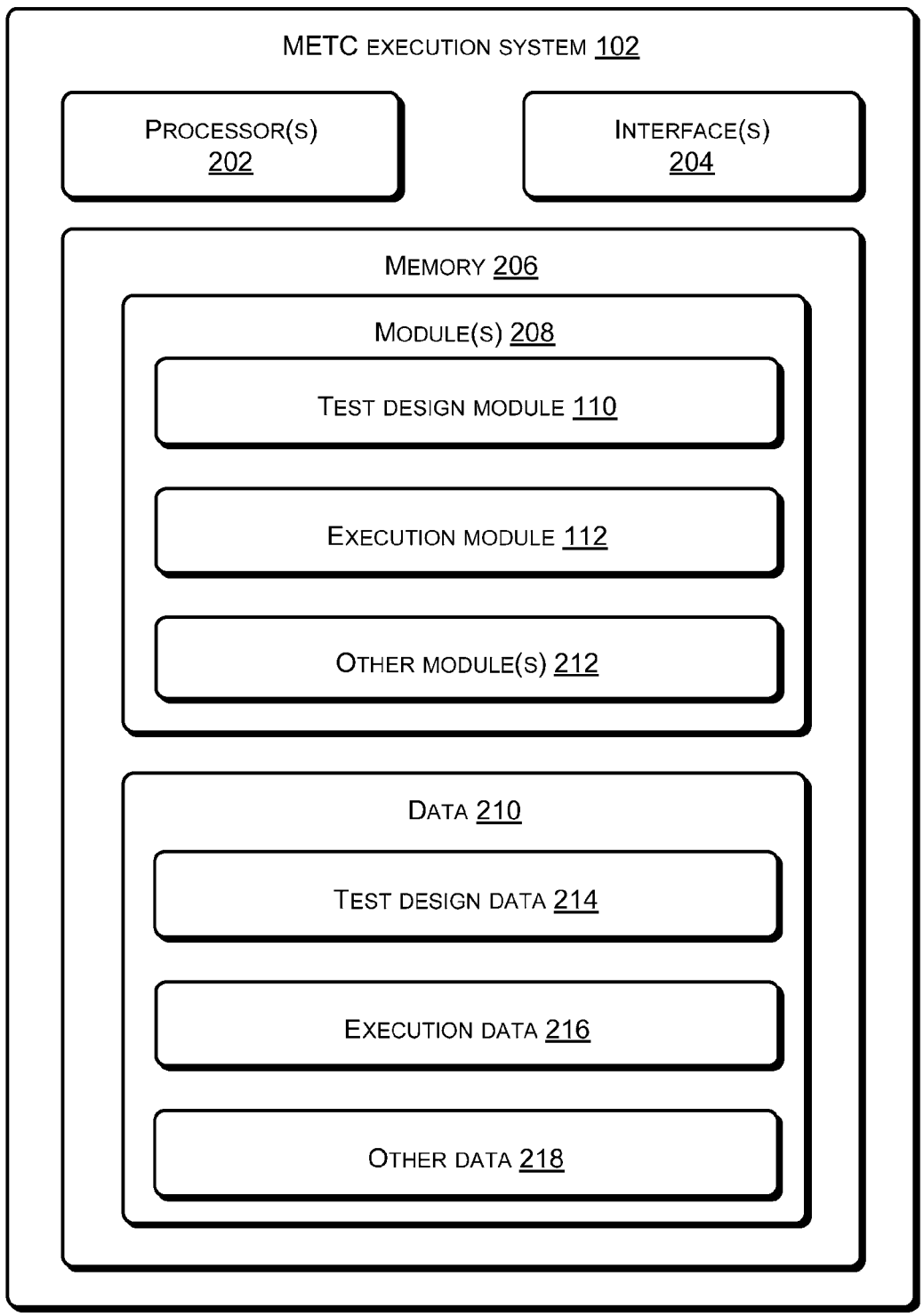
FIG. 2 illustrates an METC execution system for managing test cases, in accordance with an embodiment of the present subject matter.

FIG. 2 illustrates the METC execution system 102, in accordance with an embodiment of the present subject matter. In said implementation, the METC execution system 102 includes one or more processor(s) 202, interface(s) 204, and a memory 206 coupled to the processor 202. The processor 202 can be a single processing unit or a number of units, all of which could also include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 206.

The interfaces 204 may include a variety of software and hardware interfaces, for example, interface for peripheral device(s), such as a keyboard, a mouse, an external memory, and a printer. Further, the interfaces 204 may enable the METC execution system 102 to communicate with other computing devices, such as web servers and external data repositories, such as the database 106, in the communication network. The interfaces 204 may facilitate multiple communications within a wide variety of protocols and networks, such as a network, including wired networks, e.g., LAN, cable, etc., and wireless networks, e.g., WLAN, cellular, satellite, etc. The interfaces 204 may include one or more ports for connecting the METC execution system 102 to a number of computing devices.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 also includes module(s) 208 and data 210.

The module(s) 208 include routines, programs, objects, components, data structures, etc., which perform particular tasks or implement particular abstract data types. In one implementation, the module(s) 208 includes the test design module 110, the execution module 112, and other module(s) 212. The other module(s) 212 may include programs or coded instructions that supplement applications and functions of the METC execution system 102.

On the other hand, the data 210, inter alia serves as a repository for storing data processed, received, and generated by one or more of the module(s) 208. The data 210 includes for example, test design data 214, execution data 216, and other data 218. The other data 218 includes data generated as a result of the execution of one or more modules in the module(s) 208.

In one implementation, the METC execution system 102 can be configured to manage a workflow based on execution of the METCs. The METCs, as described earlier, can each include a plurality of test steps, where each of the test steps can be executed based on a role associated with each of the test steps. The METC execution system 102 can be configured to carry out or proceed with the workflow based on the execution of the test steps. In this manner, a substantially high level of automation and digitization can be provided to the workflow. In one example, the workflow can relate to a software testing workflow, hereinafter referred to simply as the testing workflow.

In one implementation the METC execution system 102 includes the test design module 110. The test design module 110 can be configured to assign one or more roles to each of the test steps of the METC. In one example, the roles can be indicative of a privilege or access level required to execute the test step that the role is assigned to. In one example, more than one role can be assigned to a test step. In this case, multiple users associated with the roles will be able to execute the test steps. By said assignment of roles, the METC execution system 102 can be configured to provide a substantially high degree of test case traceability and logging of results of the execution thereof. This can be further beneficial in those testing workflows, which have a vast number of test cases to be executed and the results logged thereof. The test design module 110 can be further configured to store the assigned roles in the test design data 214.

In one implementation, the test design module 110 can be configured to define a failure condition for each of the plurality of test steps. In one example, the failure condition can be indicative of an expected result of execution of each a test step. The expected result can be a threshold value, where an actual result of a test step execution, below said threshold value, can be indicative of a 'fail' and an actual result above said threshold value can be indicative of a 'pass'. In one example, the test design module 110 can be further configured to store the failure condition in the test design data 214.

In one implementation, the test design module 110 can be configured to specify a failure action for execution of a subsequent test step in the testing workflow. For example, the failure action can be an action to be taken by the METC execution system 102, pertaining to the execution of the subsequent test step in the METC, on triggering of the failure condition. In said example, if the failure action for the test step indicates 'continue' on triggering of the failure condition of the test step, then the user of the subsequent test step can be notified of said failure condition being triggered of the previous test step, and also be instructed to proceed with the execution of the subsequent test step based on the failure action. In this manner, the METC execution system 102 facilitates a dependency between the testing workflow and the execution of the test steps therein. In case the failure action of a particular test step indicates a 'continue' on triggering of the failure condition of the test step, the role assigned to the subsequent test step will be instructed by the METC execution system 102 to proceed with the execution of the said step. In case the failure action of a particular test step indicates a 'stop' on the triggering of the failure condition of the test step, the METC execution system 102 will halt the execution of the subsequent test steps, therefore not allowing any user to proceed with the execution. In one example, the test design module 110 can be configured to store rules pertaining to the failure action in the test design data 214.

In one implementation, the execution module 112 can be configured to execute each of the plurality of test steps of the METC based on the assigned roles. For example, the execution module 112 can be configured to verify the role before executing the test step. Upon successful authentication of the role, the execution module 112 can be configured to proceed with the execution of the test step. In said example, a user can be required to verify himself before gaining access to the METC execution system 102 to execute the test step associated with the role. In another example, the execution module 112 can be configured to store information pertaining to said verification in the execution data 216.

In one implementation, the execution module 112 can be configured to fetch the associated failure condition from the test design data 214 and apply said failure condition at the end of the execution of the test step. In one example, the execution module 112 can be configured to compare an actual result of the test step execution, with an expected result of the test step execution to determine if the failure condition has been triggered or not. As described earlier, the expected result of the test case execution is indicated by the failure condition by the test design module 110. In one example, the execution module 112 can be configured to store data pertaining to said application of the failure condition in the execution data 216.

During operation, upon triggering of the failure condition, the execution module 112 can be configured to proceed with the execution of a subsequent test step in the METC based on the failure action associated with the failure condition of the previous test step execution. For example, if in the previous test step execution, the failure condition was triggered, the execution module 112 can be configured to fetch the failure action associated with said failure condition from the test design data 214 and proceed with the execution of the subsequent test step based on the rules defined in the failure action. As described earlier, in case the failure action for said failure condition is 'continue', the execution module 112 can be configured to proceed with the execution of the subsequent test step, and in case the failure action is 'stop', the execution module 112 can be configured to stop the testing workflow.

Furthermore, upon triggering of the failure condition for the execution of a particular test step, the execution module 112 can be configured to notify the user associated with the role assigned to the subsequent test step. In said example, the user of the role assigned to the subsequent test step, can be notified based on the failure action via a Graphical User Interface (GUI) of the METC execution system 102, of said execution. Therefore, the METC execution system 102 can be configured to manage a testing workflow, having a plurality of METC's, which in turn has multiple test steps. By assigning said roles at the test step level, a substantially fine grained control is achieved of the testing workflow, thereby increasing traceability and logging of the testing workflow. Furthermore, the METC execution system 102 can be configured to automatically provide test step execution details to users, upon execution of the test cases. In one example, the test step execution details can include but is not limited to, a time of execution, duration of execution, and details of the role that executed the test step.

Figure 3:
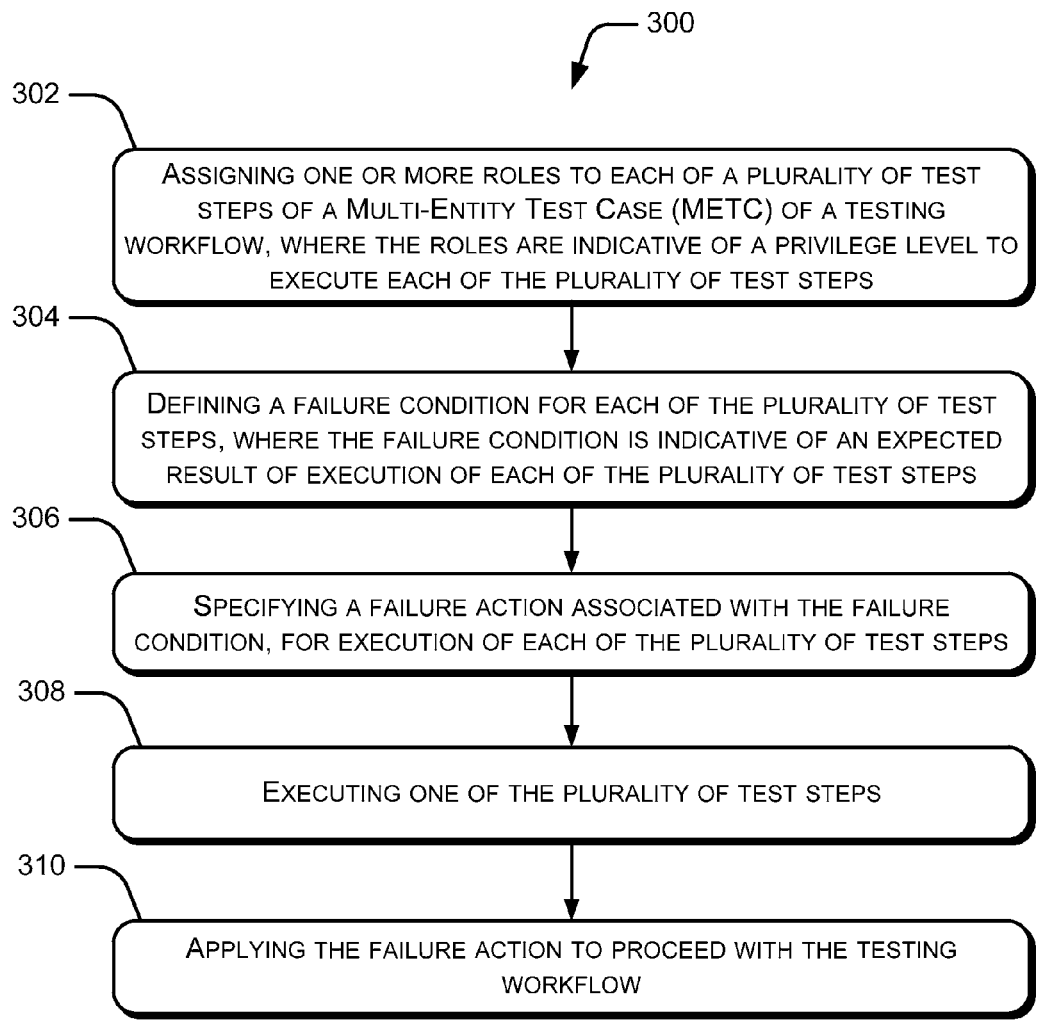
FIG. 3 illustrates a method for managing a testing workflow, based on an execution of a METC, in accordance with an embodiment of the present subject matter.

FIG. 3 illustrates a method 300 for managing a testing workflow, based on an execution of at least one METC of the testing workflow, according to one embodiment of the present subject matter. The method 300 may be implemented in a variety of computing systems in several different ways. For example, the method 300, described herein, may be implemented using the METC execution system 102, as described above.

The method 300, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 300.

The order in which the method 300 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 300 is described with reference to the METC execution system 102, the description may be extended to other systems as well.

At block 302, one or more roles can be assigned to each of a plurality of test steps of at least one METC. In one example, the testing workflow can include the execution of a plurality of METCs, where each of the METCs can include one or more test steps. The roles thus assigned, can be indicative of a privilege or access level required to execute the test step. In a case where more than one role is assigned to a single test step, each of these roles will be provided with sufficient rights or privileges to access and execute the test step. In an example, a user associated with the role may be required to authenticate himself in order to gain access to the test step execution process. In said example, the functionality of authentication can be provided by a GUI of a METC execution system 102 as described earlier. In a further example, said roles can be assigned by a test design module 110 of the METC execution system 102 in a manner described earlier.

At block 304, a failure condition can be defined for each of the plurality of test steps. In one example, the failure condition can be indicative of an expected result of execution of each of the plurality of test steps. During the execution of each of the plurality of test steps, if an actual result of a test step execution is above the threshold value, this can indicate a 'pass' for the test step execution. Furthermore, in the case where the actual result is below the threshold value, this can be said to be a 'fail' for the test step execution. As indicated earlier, in one example, the test design module 110 of the METC execution system 102 can be configured to define the failure condition of each of the plurality of test steps of the METC.

At block 306, a failure action associated with the failure condition can be specified for execution of each of the plurality of test steps of the METC. For example, if the test step that is executed is of substantial importance to the testing workflow, then on triggering of the failure condition of said test step, the failure action can be specified as 'stop', whereby this implies not to proceed with the execution of the subsequent test step in the testing workflow. In certain cases, if the test step is not essential for the testing workflow, the testing workflow need not be interrupted, and the failure action can be specified to be 'continue'. In this manner, a substantially high degree of flexibility can be provided to the testing workflow, in dependence to the execution of the METCs therein. In one example, the test design module 110 of the METC execution system 102 can be configured to specify the failure action.

At block 308, the test step can be executed. In one example, before executing a particular test step, the role associated with said test step can be verified. In one example, a user of the role can be required to authenticate himself to execute the test step. Once the role is verified, the test step can be executed. Upon successful execution, the results can be automatically obtained thereof, and can be compared to the value defined in the failure condition in order to ascertain whether the test step has failed or passed.

At block 310, upon ascertaining whether the failure condition has been triggered or not, the failure action can be applied in order to decide whether to proceed with the execution of the subsequent test step. In one example, an execution module 112 of the METC execution system 102 can be configured to verify the one or more roles associated with the test steps, execute the test steps upon successful verification, apply the failure condition, and proceed with the execution of the subsequent test step based on the failure action.

In one implementation, a Graphical User Interface (GUI) can be provided via which users can manage testing workflows according to the present subject matter. For example, the users can provide the authentication details in order to authenticate the roles assigned to the one or more test steps via the functionality of the GUI, and proceed with the execution of the test step accordingly. Upon successful execution of the test step, as described earlier, the user associated with the role of the subsequent test step can be notified via the GUI. Similarly upon the triggering of the failure condition of a test step, required users can be notified via the GUI. In this manner the GUI can facilitate a substantially high degree of usability and traceability, even for testing workflows having a vast number of METCs.

Although implementations of multi-entity test case execution workflow have been described in language specific to structural features and/or methods, it is to be understood that the present subject matter is not necessarily limited to the specific features or methods described. Rather, the specific features and methods are disclosed as implementations for multi-entity test case execution workflow.

We claim:

1. A computer implemented method for managing a testing workflow, based on execution of at least one Multi Entity Test Case (METC) of the testing workflow, the method comprising:
    assigning at least one role to each of a plurality of test steps of the METC, wherein the at least one role is indicative of a privilege level to execute each of the plurality of test steps;
    defining a failure condition for each of the plurality of test steps, wherein the failure condition is indicative of an expected result of execution of each of the plurality of test steps;
    specifying a failure action associated with the failure condition for execution of each of the plurality of test steps;
    executing one of the plurality of test steps; and
    applying the failure action to proceed with the testing workflow.

2. The method as claimed in claim 1, wherein the method further comprises verifying the at least one role assigned to a test step before executing the test step.

3. The method as claimed in claim 1, wherein the method further comprises comparing an actual result of the execution with the failure condition.

4. The method as claimed in claim 1 further comprising notifying a user of the role of one of a success or failure of the execution of each of the plurality of test steps.

5. A METC execution system for managing METCs, the METC execution system comprising:
    a processor; and
    a memory coupled to the processor, the memory comprising:
        a test design module configured to:
            assign at least one role to each of a plurality of test steps of at least one METC of a testing workflow, wherein the role is indicative of a privilege level to execute each of the plurality of test steps;
            define a failure condition for execution of each of the plurality of test steps, wherein the failure condition is indicative of an expected result of the execution; and
            specify a failure action associated with the failure condition for execution of each of the plurality of test steps; and
        an execution module configured to:
            proceed with the testing workflow based on the assigned role, and the failure action.

6. The METC execution system as claimed in claim 5, wherein the execution module is further configured to:
    verify the role assigned to a test step before executing the test step;
    execute the test step based on the verification;
    compare actual execution results with the failure condition; and
    apply the failure action associated with the failure condition based on the comparison in order to proceed with the testing workflow.

7. The METC execution system as claimed in claim 5, wherein the failure action is one of 'stop' and 'continue'.

8. The METC execution system as claimed in claim 7, wherein the execution module is configured to stop the testing workflow upon receiving the 'stop' failure action, and wherein the execution module is configured to proceed with the testing workflow upon receiving the 'continue' failure action.

9. The METC execution system as claimed in claim 5, wherein the execution module is further configured to notify users based on the role, of the actual execution results of each of the plurality of test steps, and the failure action.

10. A non-transitory computer-readable medium having embodied thereon a computer program for executing a method comprising:
    assigning at least one role to each of a plurality of test steps of a METC, wherein the at least one role is indicative of a privilege level to execute each of the plurality of test steps;
    defining a failure condition for each of the plurality of test steps, wherein the failure condition is indicative of an expected result of execution of each of the plurality of test steps;
    specifying a failure action associated with the failure condition for execution of each of the plurality of test steps; and
    proceeding with the testing workflow based on the role, and the failure action.

* * * * *